No. 745,936. PATENTED DEC. 1, 1903.
F. A. VIANEST.
STARTING GATE.
APPLICATION FILED AUG. 7, 1903.
NO MODEL.
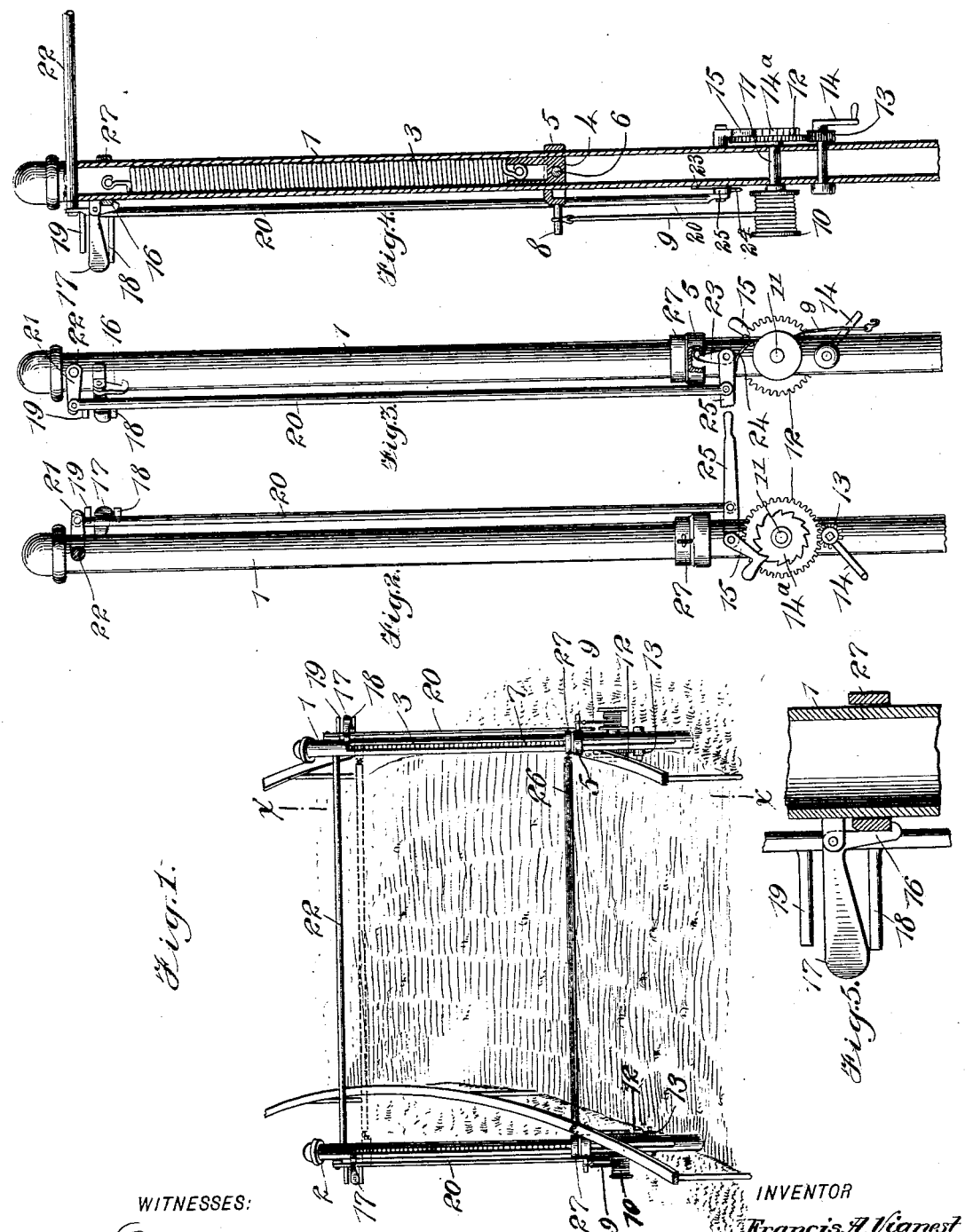
INVENTOR
Francis A. Vianest
BY
ATTORNEYS
WITNESSES:

No. 745,936. Patented December 1, 1903.

UNITED STATES PATENT OFFICE.

FRANCIS A. VIANEST, OF NEW YORK, N. Y., ASSIGNOR OF ONE-HALF TO GEORGE F. CORNELIUS, OF BROOKLYN, NEW YORK.

STARTING-GATE.

SPECIFICATION forming part of Letters Patent No. 745,936, dated December 1, 1903.

Application filed August 7, 1903. Serial No. 168,605. (No model.)

*To all whom it may concern:*

Be it known that I, FRANCIS A. VIANEST, a citizen of the United States, and a resident of the city of New York, borough of Brooklyn, county of Kings, and State of New York, have invented a new and Improved Starting-Gate, of which the following is a full, clear, and exact description.

This invention relates to improvements in starting-gates for use on race-tracks, an object being to provide a starting-gate of simple construction and having a direct and quick perpendicular movement.

I will describe a starting-gate embodying my invention and then point out the novel features in the appended claims.

Reference is to be had to the accompanying drawings, forming a part of this specification, in which similar characters of reference indicate corresponding parts in all the figures.

Figure 1 is an elevation of a starting-gate embodying my invention. Fig. 2 is a section on the line *x x* of Fig. 1. Fig. 3 is a side elevation. Fig. 4 is a sectional elevation of one of the standards, and Fig. 5 is a sectional detail showing one of the locking devices for holding the gate in its uppermost position.

The gate comprises standards 1 2, arranged at opposite sides of the track, as clearly indicated in Fig. 1. The standards are tubular, and in each standard is a spring 3, secured at its upper end to the standard and at its lower end to a carrier or plunger 4. Movable upward and downward on each standard is a ring 5, which is connected by means of a pin 6 with the carrier 4, the said pin passing through a slot 7, formed in the standard. From pins 8 on the rings 5 draw lines or ropes 9 extend downward to windlasses 10, mounted on shafts 11, and on these shafts 11 are gear-wheels 12, engaging with pinions 13, on the shafts of which are crank-handles 14. Connected to each gear-wheel 12 or to the shaft thereof is a ratchet-wheel 14ª, engaged by a pawl 15, the said pawl being weighted, as clearly indicated in Fig. 2. At the upper end of each standard is a weighted pawl 16, the weighted or arm portion 17 of which extends between fingers 18 19, extended outward from a rod 20, the upper ends of the rods being pivotally connected to arms 21, extended outward from a rock-shaft 22. The lower ends of the rods 20 are connected to pawls 23, designed to engage with the rings 5. Extended outward from one of the pawls 23 is an operating-lever 25, and the pawls 23 are held yieldingly in engagement with the rings by means of a spring 24, pressing upward on the lever 25. A webbing 26, preferably of elastic material, has its ends connected to rings 27, engaging around the standards 1 above the rings 5.

In operation when in lowered position the rings 5 will be engaged by the pawls 23 and the rings 27 will rest on said rings 5, as indicated in Fig. 1. The springs 3 at this time will be expanded. When it is desired to raise the gate, the pawls 15 are to be released from the ratchet-wheels 14ª. Then by moving the lever 25 downward the pawls 23 will be released from said rings 5, so that the springs will move the carriers, with the rings 5, quickly upward, and the impetus imparted to the rings 27 will carry the barrier upward until the rings 27 engage with the pawls 16.
The fingers or arms 19 will prevent the pawls 16 from swinging too far upward. If it is desired to move the gate to its lowermost position, the lever 25 is to be moved upward, causing a rocking movement of the shaft 22 and through the medium of the arms 18 swinging the pawls 16 out of engagement with the rings 27, thus permitting the said rings, with the barrier, to move downward by gravity, and, of course, before this downward movement the drums 10 are to be rotated to draw the carriers to their lowermost position.

Having thus described my invention, I claim as new and desire to secure by Letters Patent—
1. A starting-gate comprising tubular standards, springs arranged in said standards, carriers movable in the standards and connected to said springs, rings surrounding the standards and having connection with the carriers, barrier-supporting rings surrounding the standards above the first-named rings, locking devices for engaging said barrier-supporting rings while in uppermost position, means for simultaneously releasing said rings, locking devices for securing the first-named rings in their lowermost position, and means for simultaneously releasing the locking devices.

2. A starting-gate comprising tubular standards, spring-actuated rings surrounding the standards, locking devices for securing said rings in their lowermost position, winding-drums supported on the standards, connections between said drums and said rings, gear mechanism for operating the drums, rings surrounding the standards above the first-named rings, a barrier having connection with said rings, pawls mounted to swing on the upper ends of the standards and adapted for engaging with said barrier-carrying rings, and means for simultaneously releasing said pawls from the barrier-carrying rings.

3. A starting-gate comprising tubular standards, the said standards being longitudinally slotted, carriers arranged to work in said standards, springs arranged in the standards and connected at one end to the standards and at the other end to the carriers, rings mounted to slide on the standards, pins passing from said rings through the slots of the standards and engaging with the carriers, means for moving said rings downward with the carriers, pawls for locking said rings in lowered position, means for releasing the pawls from the rings, barrier-carrying rings arranged to slide on the standards above the first-named rings, pawls for engaging with said barrier-carrying rings at the upper ends of the standards, and means for simultaneously releasing said pawls from the rings.

4. A starting-gate comprising standards, carriers movable in said standards, springs for causing the upward movements of the carriers, means for moving the carriers downward, locking devices for said carriers, means for simultaneously releasing said locking devices, rings movable on the standards and operated in upward direction by said carriers, a barrier having connection with said rings, a rock-shaft having bearings in the standards, and pawls having connection with said rock-shaft, the said pawls being designed for locking the barrier-carrying rings in uppermost position.

5. A starting-gate comprising standards, a barrier movable along said standards, spring-actuated devices for moving the barrier upward on the standards, and means for moving said spring-actuated devices downward on the standards while the barrier is in its uppermost position.

6. A starting-gate comprising standards, a barrier movable along said standards, spring-actuated devices for moving the barrier upward on the standards, pawls for locking the barrier in its uppermost position, means for simultaneously releasing said pawls from the barrier, and means for moving said spring-actuated devices downward on the standards while the barrier is in its uppermost position.

In testimony whereof I have signed my name to this specification in the presence of two subscribing witnesses.

FRANCIS A. VIANEST.

Witnesses:
GEORGE F. CORNELIUS,
HENRY SHERGER.